2,929,267
Patented Mar. 22, 1960

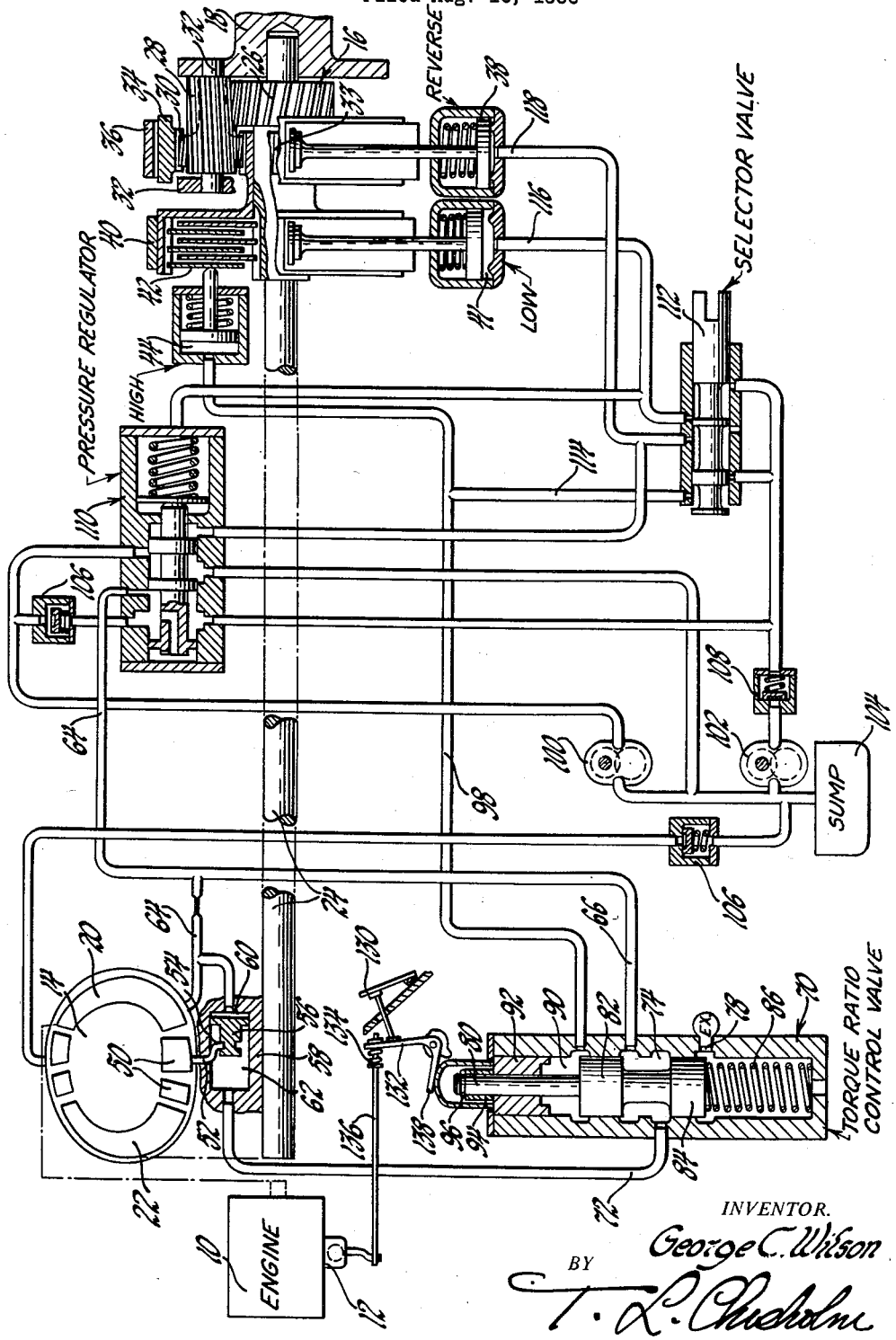

2,929,267

TRANSMISSION

George C. Wilson, Flint, Mich., assignor to General Motors Corporation, Detroit, Mich., a corporation of Delaware Application August 16, 1956, Serial No. 604,403

11 Claims. (Cl. 74—645)

This invention relates to power transmissions in which a hydrodynamic torque converter drives change-speed gearing which in turn drives a power output device, such as the propeller shaft of an automobile, for example as disclosed in British Patent 653,230, published May 9, 1951.

In general the objects of this invention includes the provision of an improved arrangement for controlling the torque of a hydrodynamic torque converter and a system of control for coordinating the control of the torque with the condition of the gearing as will be more fully explained in the following description.

The drawing is a diagrammatic illustration of a transmission embodying one form of the invention.

As represented in the drawing an engine 10, controlled by a throttle 12, drives a torque converter 14 which in turn drives forward and reverse change-speed gearing 16, which in turn drives an output shaft 18 which may be connected to the propeller shaft of an automobile. Any suitable form of gearing may be used, for example that shown in the British patent referred to which includes a planetary gear set having a low forward speed, a high or direct drive forward speed and a low reverse speed.

The torque converter may include an impeller 20 driven by the engine and circulating liquid as is known through one or more turbine such as the turbine 22 which drives the torque converter output shaft 24 which drives the gearing. The shaft 24 drives an input sun gear 26 which meshes with a plurality of long planet gears 28, the forward ends of which also mesh with short planet gears 30; both sets of planet gears being mounted on a carrier 32. The short planets 30 also mesh with a reaction sun gear 33 which can either be held or turn free on the shaft 24 and they also mesh with a reaction ring gear 34 which can be locked to the casing of the transmission by a reverse brake band 36 which can be set by any suitable expansible chamber motor having a fluid pressure chamber 38. The reaction sun gear can be held fast to provide low forward speed by a forward brake 40 which can be set by a fluid pressure chamber 41. The reaction sun gear 33 alternatively may be connected to the torque converter output shaft 24 by a direct drive clutch 42 which can be set by an expansible chamber motor having a fluid pressure chamber 44. When the clutch 42 is engaged it provides high speed or low torque ratio forward drive which preferably is one-to-one. Thus, the gearing may be selectively conditioned to provide a plurality of driving ratios which include forward and reverse drive, or positive and negative ratios, regardless of their arithmetical values, and include ratios of different numerical value in the same direction, that is, high and low speed forward drive.

The torque converter 14 may be of any suitable type in which there is means for varying the range of torque multiplication or torque ratio between the impeller 20 or engine shaft and the turbine 22 or output shaft 24. Preferably the torque is varied by changing the angle of reaction vanes or blades 50 which guide the liquid from the turbine 22 to the impeller 20, as is known. As illustrated herein by way of example each reaction blade is mounted on a shaft 52 having a crank 54 disposed in an annular groove in an annular piston 56 sliding in an annular cylinder 58 and dividing it into two pressure chambers 60 and 62. The high angle chamber 60 is constantly connected by a conduit 64 with the working space in the converter 14 which is continuously supplied with fluid under pressure from a source which will be described. This pressure in the chamber 60 constantly urges the piston 56 to the left as the drawing is seen tending to place the blades 50 in a high angle position in which they redirect oil from the turbine 22 through a relatively high angle to the impeller 20 and thus provide a relatively high range of torque multiplication in the torque converter. The pressure of the fluid in the chamber 60 is opposed by the hydraulic or hydrodynamic force on the blades 50 of oil circulating in the torque converter which constantly urges the blades toward a position parallel with the direction of the flowing oil because the area of each blade on the downstream side of its pivot 52 is greater than the area on the upstream side. The area of the piston 56 and the pressure maintained in the torque converter 14 are so chosen that the piston overcomes the force of oil on the blades 50 and holds them in high angle position provided the chamber 62 contains no pressure.

The pressure of the high-angle chamber 60 may be overcome to hold the blades in low angle position by pressure of fluid admitted to low-angle chamber 62, either to balance the force of the chamber 60 on the piston and so permit the hydraulic force on the blades to move the blades to low angle or the pressure in the chamber 62 may be higher than the pressure of the chamber 60 and positively move the blades to low angle. The arrangement is such that during normal running fluid under pressure is supplied to the low-angle chamber 62 by any suitable apparatus, an illustration of which will be described, and the blades are held in low angle. Whenever it is desired to put the blades in high angle to produce a higher range of torque ratio to the torque converter the chamber 60 is vented to permit the pressure in the chamber 60 to move the blades to high angle against the hydraulic force on the blades 50 in the working space.

The transmission so far described is known and many examples have been built and used. These operate satisfactorily but under certain conditions it has been found undesirable to put the torque converter in high torque ratio condition while the change-speed gear 16 is in high torque ratio condition, that is when it is in either low forward speed or in reverse. This is particularly important in the case of cars equipped with high torque engines.

It is one of the objects of the present invention to provide an improved system of control for the apparatus which determines the range of torque ratio in the torque converter, and one which makes it impossible for the driver of the car to condition the torque converter for high torque multiplication when the gearing is also conditioned for high torque multiplication. One way of carrying out this object is illustrated in the drawing which shows a hydraulic link between a valve which fills or vents the low-angle chamber 62 and the actuator for this valve, this hydraulic link being connected to the direct drive clutch chamber 44. Unless the gearing is in direct drive or high-speed ratio drive or low torque ratio drive (the latter two of which are synonymous terms) the hydraulic link cannot be operated and thus the torque converter cannot be conditioned for high range torque multiplication.

Oil under pressure can be admitted to the chamber 62 from any suitable source (for example the conduit 66 connected to the conduit 64) when permitted by a torque ratio control valve 70. This is a two-position valve which either conducts oil under pressure from the conduit 66 to the cylinder 62 by conduit 72 or interrupts the supply of oil from the conduit 66 and vents the cylinder 62. The valve 70 includes a chamber 74 connected to conduits 66 and 72, and having a vent port 78. In the chamber is a valve stem 80 having a pair of lands 82 and 84 separated by a groove. A spring 86 constantly urges the valve stem 80 toward the position shown in the drawing in which communication is established between conduit 66 and the pressure chamber 62. Above the land 82, which forms a piston for moving the valve stem 80 is a chamber or space 90 forming a hydraulic link or balanced fluid pressure chamber by which the valve stem 80 may be moved down to vent the cylinder 62. A second piston 92 completes the chamber 90 and this second piston is loosely mounted on the stem 80 so that it has a one-way connection with the stem and can move the stem only upward. This may be done by collar 94 and snap ring 96. When the chamber 90 is filled with trapped liquid or with fluid under pressure, which can be supplied through the conduit 98, pressure of this fluid against the land 82 urges the valve stem down against the spring 86 and the pressure acting against the piston 92, the area of which is equal to or greater than the area of the piston 82 urges the valve stem up, as the drawing is seen. The pressure of fluid in the chamber 90 is thus balanced and has no effect on the position of the valve stem.

If the piston 92 is urged downward against the force of fluid pressure in the chamber 90 by any outside means, then the upper face of the piston 82 forms an operator by which the valve stem 80 is moved down against the spring to a position in which the land 82 covers the conduit 66 and the land 84 uncovers the exhaust port 78 and vents the cylinder 62. However, when there is no liquid trapped in chamber 90, nor fluid under pressure in the chamber, and the piston 92 is moved down by external force, nothing happens. The piston merely slides down the valve stem and the valve remains held by spring 86 in the position which is shown in the drawing.

The system for controlling the transmission includes a source of fluid under pressure which may include a front pump 100 driven by the engine and a rear pump 102 driven by the output shaft 18 which pumps withdraw oil from a sump 104 and supply it through check valves 106 and 108, respectively, to a pressure regulator valve generally designated by 110 and a selector valve generally designated by 112, which latter selectively direct oil to a high clutch line 114 or to a low brake line 116 or to the reverse brake line 118. The manual control valve 112 when supplying oil to any of the chambers 38, 41, 44 vents both the other chambers. The pressure regulator valve 110 continually supplies oil at a predetermined pressure from either the outlet of check valve 106, or the outlet of check valve 108, or both, to the converter supply line 64 which is the source of supply of oil under pressure to the working space of the converter 14 and to the pressure chamber 60. The conduit 66 is connected to the conduit 64 which is also the source of supply of fluid under pressure to the pressure chamber 62. The conduit 98 which supplies the hydraulic link 90 is connected to the high clutch line 114 so that the chamber 90 is filled whenever the high clutch is set and at other times is vented.

The drawing illustrates one form of apparatus for moving the blades 50 to high angle whenever it is desired, provided the gearing 18 is in direct drive. The engine throttle 12 may be opened by a pedal 130 which pushes on one arm 132 of a bell crank which pushes on a spring 134 and urges a rod 136 to the left against the force of return spring (not shown). The spring 134 provides a lost-motion connection between the pedal 130 and the throttle. During all movements of the throttle pedal from closed throttle or idling to fully open throttle, the spring 134 transmits the motion of the pedal 130 to the rod 136 and during this range of movement the other arm 138 of the bell crank has no effect. But when the throttle pedal 130 is pressed past the position of wide-open throttle, the spring 134 lets the bell crank arm 132 move farther to the left and the bell crank arm 138 pushes the piston 92 down. If the transmission is in direct drive and only if it is, the chamber 90 is filled with oil from the conduit 98 and depression of the piston 92 moves the valve stem 80 down to interrupt the supply of oil from the conduit 66 to the chamber 62 and vent chamber 62 whereupon the blades 50 are moved to high angle position by the pressure in the chamber 60. However, if the transmission is in low forward drive or in reverse the chamber 90 is vented and depression of the piston 92 by the bell crank arm 138 has no effect.

This constitutes an arrangement for increasing both torque ratio of the torque converter and the range of speeds of the car throughout which a relatively high torque is delivered and increasing them in response to torque demand on the engine when and only when the gearing of the transmission is in one particular torque ratio.

The blades 50 are the primary movable control members for changing the torque, and they in turn are moved by the piston 56 and by the valve stem 80 which constitute secondary movable control members for changing the torque. These control members are moved or actuated by the primary actuator which is the piston 92 which is in turn moved by the secondary actuators, the bell crank arm 138 or 132 and the pedal 130.

I claim:

1. A transmission comprising in combination a hydrodynamic torque converter, which drives change-speed gearing adapted to drive a load, said converter having an impeller, a turbine, and reaction means which is adjustable to vary the change of direction of liquid between the turbine and the impeller means for selectively establishing a plurality of speed ratios in the gearing, including a fluid pressure operated means for establishing one ratio, a fluid pressure operated control means for influencing the range or torque ratios of the converter by adjusting the reaction member to vary said change of direction, an actuator for moving the control means to change the torque ratio of the converter means for containing fluid under pressure for transmitting motion from the actuator to the control means, means for selectively venting or supplying fluid under pressure to said first-mentioned fluid pressure operated means for preventing the establishment of said one ratio or establishing said one ratio, and a fluid connection between said fluid pressure operated means for establishing said one ratio and said means for containing fluid under pressure to permit or prevent actuation of the control means according to whether said one ratio is established or is prevented from being established.

2. A transmission comprising in combination a hydrodynamic torque converter which drives change-speed gearing adapted to drive a load, means for selectively establishing a plurality of speed ratios in the gearing including means adapted selectively to be filled with fluid under pressure or vented and when filled adapted to establish one ratio, a movable control member for influencing the torque ratio of the torque converter, an actuator adapted to move the control member to change the torque ratio of the converter, means between the actuator and the control member adapted when filled with fluid under pressure to transmit motion from the actuator to the control member and a conduit connecting the last-mentioned means and the fluid pressure means for establishing said one ratio whereby the fluid pressure motion transmitting means is filled when and only when said one ratio is established.

3. A transmission comprising in combination a hydrodynamic torque converter which drives change-speed gearing adapted to drive a load, means for selectively establishing a plurality of speed ratios in the gearing, including a fluid pressure operated means for establishing one ratio, a movable control member for influencing the torque ratio of the torque converter, a fluid pressure chamber, a first piston in the chamber adapted to urge the control member in one direction in response to pressure in the chamber, a second piston spaced from the first piston in the chamber and having a one-way motion-transmitting connection with the control member and being adapted to urge the control member in the opposite direction in response to pressure in the chamber, means for moving the second piston toward the first piston, and a conduit between the fluid pressure operated means and the space between the pistons.

4. A transmission comprising in combination a hydrodynamic torque converter which drives change-speed gearing adapted to drive a load, means for selectively establishing a plurality of speed ratios in the gearing, including a fluid pressure operated means for establishing one ratio, a movable control member for influencing the torque ratio of the torque converter, a fluid pressure chamber, a first piston in the chamber adapted to urge the control member in one direction in response to pressure in the chamber, a second piston spaced from the first piston in the chamber and having a one-way motion-transmitting connection with the control member and being adapted to urge the control member in the opposite direction in response to pressure in the chamber, the area of the second piston being as great as the area of the first piston, means for moving the second piston toward the first piston, and a conduit between the fluid pressure operated means and the space between the pistons.

5. A transmission comprising in combination a hydrodynamic torque converter which drives change-speed gearing adapted to drive a load, means for selectively establishing a plurality of speed ratios in the gearing, including a fluid pressure-operated means for establishing one ratio, a fluid pressure-operated device for influencing the torque ratio of the torque converter, a fluid pressure cylinder, a valve for controlling the position of the torque-influencing device having an operator disposed in the cylinder, a piston in the cylinder spaced from the operator, means for moving the piston toward the valve operator, and a conduit connecting the fluid pressure operated means and the space between the piston and the valve operator.

6. A transmission comprising in combination a hydrodynamic torque converter adapted to be driven by an engine and driving change-speed gearing adapted to drive a load, means for selectively establishing in the gearing a relatively high torque ratio and a relatively low torque ratio, means for controlling the torque converter to establish selectively a relatively high range of torque ratios and a relatively low range of torque ratios, means operable in response to the torque demand on the engine adapted to establish a high range of torque ratios, and means responsive to the establishment of high torque ratio in the gearing for preventing establishment of a high range of torque ratios in the torque converter by operation of said torque-demand-responsive means.

7. A transmission comprising in combination a hydrodynamic torque converter adapted to be driven by an engine having a throttle and driving change-speed gearing adapted to drive a load, an actuator for the throttle, means for selectively establishing in the gearing a relatively high torque ratio and a relatively low torque ratio, means for controlling the torque converter to establish selectively a relatively high range of torque ratios and a relatively low range of torque ratios, means operable in response to predetermined movement of the throttle actuator adapted to establish a high range of torque ratios, and means responsive to the establishment of high torque ratio in the gearing for preventing operation of the throttle actuator from establishing a high range of torque ratios in the torque converter by operation of said torque-demand-responsive means.

8. A transmission comprising in combination a hydrodynamic torque converter having an impeller adapted to be driven by an engine controlled by a throttle and a turbine driven by the impeller and driving change-speed gearing adapted to drive a load, an actuator for the throttle, means for selectively establishing in the gearing a relatively high torque ratio and a relatively low torque ratio, an adjusting element for influencing the torque transmitted from the impeller to the turbine, means constantly urging the adjusting element toward high torque position, a fluid pressure chamber adapted when filled with fluid under pressure to overcome the urging means and hold the adjusting element in low torque position, a source of fluid under pressure, a valve adapted selectively to vent the fluid pressure chamber or connect it to said source, a cylinder, a piston in the cylinder connected to the valve and adapted to be urged by pressure in the cylinder to move the valve to venting position, a second piston spaced from the first piston in the cylinder having a one-way connection to the valve and adapted to be urged by pressure in the cylinder to move the valve toward the position connecting the cylinder to the source, means responsive to predetermined movement of the throttle actuator for moving the second piston toward the first piston, and means responsive to establishment of a relatively low torque ratio in the gearing for connecting the cylinder to the source.

9. A transmission comprising in combination a hydrodynamic torque converter having an impeller adapted to be driven by an engine controlled by a throttle and a turbine driven by the impeller and driving change-speed gearing adapted to drive a load, an actuator for the throttle, means for selectively establishing in the gearing a relatively high torque ratio and a relatively low torque ratio, including fluid-pressure-operated means for establishing low torque ratio in the gearing, an adjusting element for influencing the torque transmitted from the impeller to the turbine, means constantly urging the adjusting element toward high torque position, a fluid pressure chamber adapted when filled with fluid under pressure to overcome the urging means and hold the adjusting element in low torque position, a source of fluid under pressure, a valve adapted selectively to vent the fluid pressure chamber or connect it to said source, a cylinder, a piston in the cylinder connected to the valve and adapted to be urged by pressure in the cylinder to move the valve to venting position, a second piston spaced from the first piston in the cylinder having a one-way motion transmitting connection to the valve and adapted to be urged by pressure in the cylinder to move the valve toward the position connecting the cylinder to the source, means responsive to predetermined movement of the throttle actuator for moving the second piston toward the first piston, and a fluid conduit connecting the cylinder and the fluid pressure operated means which establishes low torque ratio in the gearing.

10. A transmission comprising in combination a hydrodynamic torque converter which drives change-speed gearing adapted to drive a load, means for selectively establishing a plurality of speed ratios in the gearing including means adapted selectively to be filled with fluid under pressure or vented and when filled adapted to establish one ratio, a movable control member for influencing the torque ratio of the torque converter, an actuator adapted to move the control member to change the torque ratio of the converter, means between the actuator and the control member adapted when filled with fluid under pressure to transmit motion from the actuator to the control member and adapted when not filled with pressure fluid to prevent transmission of motion from the actuator to the control member, and a conduit connecting the last-mentioned means and the fluid pressure means for establishing said one ratio whereby the fluid pressure motion transmitting means is filled when and only when said one ratio is established.

11. A transmission comprising in combination a hydrodynamic torque converter having an impeller adapted to be driven by an engine controlled by a throttle, reaction means having angularly adjustable blades and a turbine driven by the impeller and driving change-speed gearing adapted to drive a load, an actuator for the throttle, means for selectively establishing in the gearing a relatively high torque ratio and a relatively low torque ratio, including fluid-pressure-operated means for establishing low torque ratio in the gearing, an adjusting element adjusting the angular positions of the reaction blades and thereby for influencing the torque transmitted from the impeller to the turbine, means constantly urging the adjusting element toward high torque position, a fluid pressure chamber adapted when filled with fluid under pressure to overcome the urging means and hold the adjusting element in low torque position, a source of fluid under pressure, a valve adapted selectively to vent the fluid pressure chamber or connect it to said source, a cylinder, a piston in the cylinder connected to the valve and adapted to be urged by pressure in the cylinder to move the valve to venting position, a second piston spaced from the first piston in the cylinder having a one-way motion-transmitting connection to the valve and adapted to be urged by pressure in the cylinder to move the valve toward the position connecting the cylinder to the source, means responsive to predetermined movement of the throttle actuator for moving the second piston toward the first piston and a fluid conduit connecting the cylinder and the fluid-pressure-operated means which establishes low torque ratio in the gearing.

References Cited in the file of this patent

UNITED STATES PATENTS

| | | |
|---|---|---|
| 2,570,889 | Van Lammeren | Oct. 9, 1951 |
| 2,707,887 | Slack | May 10, 1955 |

FOREIGN PATENTS

| | | |
|---|---|---|
| 1,118,910 | France | June 13, 1956 |